Feb. 27, 1945.   O. KORNEI   2,370,176
MEANS FOR AND METHOD OF MEASURING TIME INTERVALS
Filed June 22, 1942    4 Sheets-Sheet 1
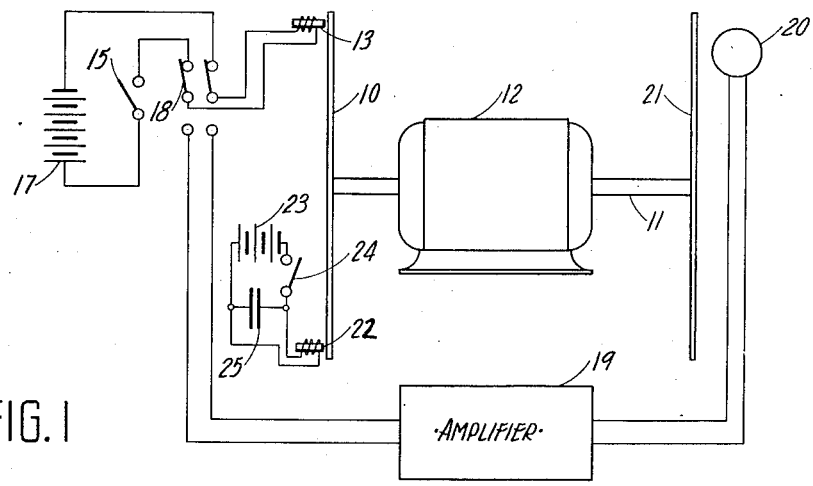
FIG. 1
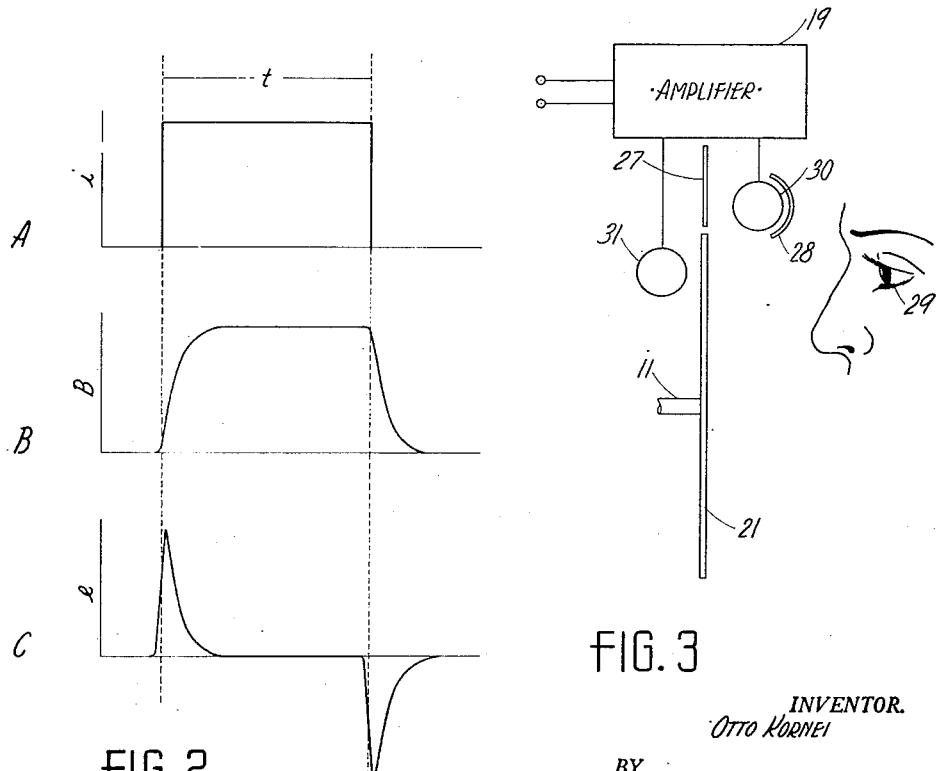
FIG. 2
FIG. 3
INVENTOR.
Otto Kornei
BY
Eben J. Hyde
ATTORNEY Feb. 27, 1945.  O. KORNEI  2,370,176
MEANS FOR AND METHOD OF MEASURING TIME INTERVALS
Filed June 22, 1942   4 Sheets-Sheet 2

INVENTOR.
OTTO KORNEI
BY
Eber J. Hyde
ATTORNEY

Feb. 27, 1945.   O. KORNEI   2,370,176
MEANS FOR AND METHOD OF MEASURING TIME INTERVALS
Filed June 22, 1942   4 Sheets-Sheet 3

INVENTOR.
OTTO KORNEI
BY
Eber J. Hyde
ATTORNEY

Feb. 27, 1945.   O. KORNEI   2,370,176
MEANS FOR AND METHOD OF MEASURING TIME INTERVALS
Filed June 22, 1942   4 Sheets-Sheet 4
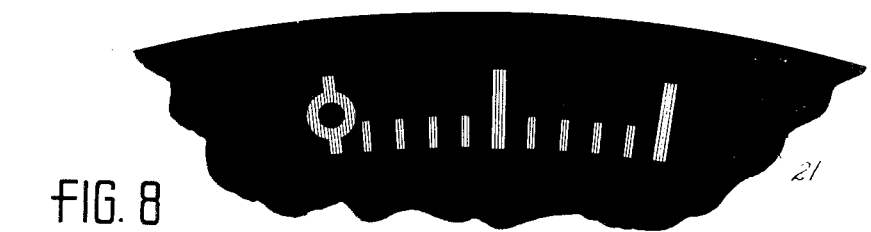
FIG. 8
FIG. 9
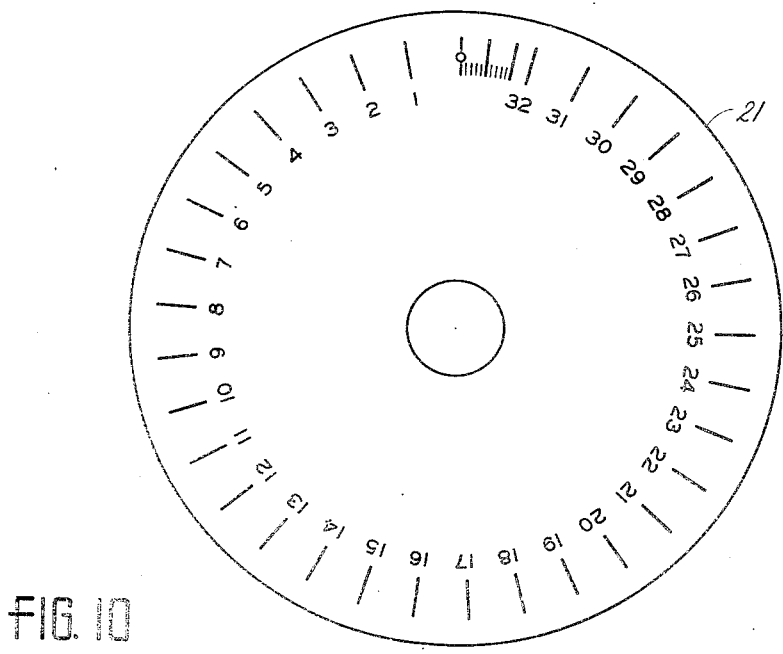
FIG. 10
INVENTOR.
OTTO KORNEI
BY
ATTORNEY Patented Feb. 27, 1945

2,370,176

UNITED STATES PATENT OFFICE 2,370,176

MEANS FOR AND METHOD OF MEASURING TIME INTERVALS

Otto Kornei, Cleveland Heights, Ohio, assignor to The Brush Development Company, Cleveland, Ohio, a corporation of Ohio Application June 22, 1942, Serial No. 447,985

40 Claims. (Cl. 161—15)

My invention pertains to timing devices and more particularly to devices adapted to time short intervals with a high degree of accuracy.

It is an object of my invention to provide means for and a method of accurately timing a short interval.

It is another object of my invention to provide an accurate timing device which is relatively small and which may easily be carried from one place to another.

It is a further object of my invention to provide a timing device for giving an accurate and immediate indication of a short time interval.

A further object of my invention is to provide a device for timing an interval of an extended length with a high degree of accuracy.

Figure 1 of the drawings is a schematic view of one form of my invention.

Figure 2 is a graphic illustration of the operation of my invention.

Figure 3 illustrates a portion of still another form of my invention.

Figure 8 shows an enlarged portion of my scale when no light is being transmitted through it, and red light is being reflected from it.

Figure 9 shows a greatly enlarged portion of my scale when green light is being transmitted through it and red light is being reflected from it.

Figure 10 represents a whole scale of the preferred type.

Figure 5:
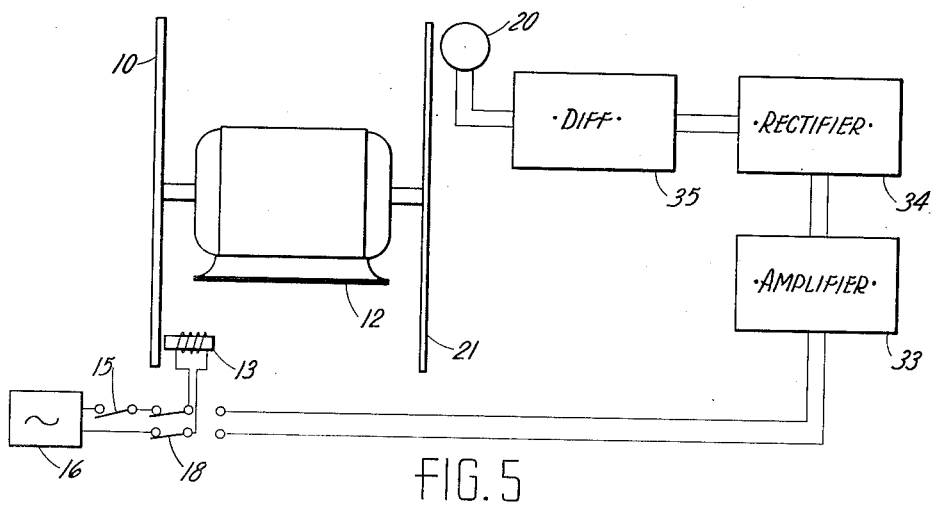
Figure 5 is a block diagram showing a form of my invention.

Briefly my invention is a timing device utilizing an endless record member which is driven at a known and constant rate of speed, and recording and reproducing means in association with the moving record member. A signal is provided for actuating the recording means, and a control circuit is used to cause the recording means to establish on the record member an indication of the duration of the interval to be timed. In order to convert the indication on the record member into an effect from which the duration of the time interval can be conveniently determined, the record is continuously driven past the reproducing means and during the repeated reproduction measurements are taken from which the time can be determined.

Briefly one form of my invention is the means for and the method of generating two very short pulses, one at the start and one at the end of a signal whose duration is identical with the duration of the interval to be timed, and which signal has been magnetically recorded on an endless magnetic material. Each of the pulses repeatedly fires a glow tube which illuminates a scale moving in synchronism with the magnetic material. By the stroboscopic effect the scale will appear to be "stopped" for observation twice in each revolution, and two superposed scale images will appear displaced with respect to each other by a certain angle, and the angle will correspond to the duration of the interval to be measured. It is to be understood that wherever the term "glow tube" is used throughout the specification and claims, it is to be construed in its broadest meaning; that is, it includes any kind of illuminating means which will give an illumination period which is short compared to the time of one revolution of the record member. While spark illumination could be used and is within the scope of my invention, I prefer to use either conventional glow tubes or arc tubes containing a rare gas or mercury vapor or the like.

The details of a preferred form of my invention are shown in Figure 1 in which the record material is a disk 10 of magnetic material mounted on a motor shaft 11. A motor 12 rotates the shaft 11 and the disk 10 at a known and constant rate of speed. A magnetic head 13 is associated with the disk 10 and may be a combination recording and reproducing head. Connected to the magnetic head 13 is a signal input circuit having a switch 15. The switch 15 is for connecting the battery 17 to the head 13 to establish in the head a magnetic flux which threads the disk 10 and leaves a magnetic indication on the disk. It preferably is an electronic switch and is adapted to be closed by a control circuit upon the start of an interval to be timed, and opened by the control circuit at the end of the interval to be timed. The closing and opening of the switch 15 causes signal current to flow from the battery 17 through the coil of the recording head 13 and establishes on the magnetic disk a magnetic pattern bearing a relationship to the length of the interval to be timed.

The direct current signal derived from battery 17 and applied to the head 13 establishes a unidirectional magnetic pattern on the disk 10, and the beginning and the end of the pattern correspond to the beginning and the end of the interval to be timed.

To convert the indication on the magnetic disk

10 into a reading which gives the value of the indication in terms of time, the switch 18 is thrown to connect the head 13 to a reproducing amplifier 19 thereby making head 13 a reproducing head. The disk 10 is driven past the reproducing head 13 thereby establishing in the output circuit for each rotation of the pattern on the disk electromotive forces which bear a relationship to the length of the interval to be timed. These electromotive forces derived from the disk 10 consist of two short, sharp pulses of opposite polarity. The generation of these two pulses comes about in the following way and is explained graphically by Figure 2(A—B—C). The magnetization established in the steel disk 10 by the recording head will be substantially rectangular except for minor deviations in shape at the beginning and the end of the signal due to the inductance of the head, the influence of the finite thickness of the recording pole piece, the influence of magnetic stray fields and hysteresis. The inductance of the head should consequently be made small compared to the resistance of the head. The transversal magnetization of the disk caused by the originally rectangular direct current signal (as shown in A) will consequently look somewhat as indicated in an exaggerated way by Figure 2(B). During the play back process this signal passes by the play back head, inducing an electromotive force proportional to the rate of change of the disk magnetization; in other words the play back head acts as a differentiating device and the generated voltage pulses will have a shape and direction substantially as indicated in 2(C). In electricity it is elementary that it is the rate of change of flux through a coil $$\left[\frac{d\phi}{dt}\right]$$

which generates an electromotive force. I provide a coil in my reproducing head 13, and as the disk 10 rotates past the head 13 the substantially rectangular magnetic field established by the signal which has previously been recorded on the disk 10, passes through the coil of the reproducing head. This rectangular magnetic field is shown in detail in Figure 2—B. As this magnetic field threads the coil of the head 13 there will be two separate instances during which there is a changing flux threading the coil. The first of these instances will be at the start of the rectangular magnetic field when the magnetic condition of the disk changes rapidly from one of no magnetization to one of a finite amount of magnetization; and the second instance will be at the end of the magnetic signal when the magnetic condition of the disk drops rapidly from the finite value to zero magnetization. Between these two instances where the disk has a uniform unchanging amount of magnetization, the coil of head 13 will be threaded by magnetic flux but the amount of flux will not be changing, so, accordingly, there is no rate of change of flux and there will be no electromotive force induced in the reproducing head.

Figure 2—C shows the two pulses of electromotive force which are generated from the reproducing head 13. They are of opposite polarity due to the fact that the pulse corresponding to the start of the rectangular magnetic signal is generated in accordance with an increasing amount of magnetism in the disk 10, while the pulse corresponding to the end of the magnetic signal is generated in accordance with a decreasing amount of magnetism in the disk 10. It can be seen that the spacing between the steep fronts of the pulses corresponds substantially to the original time interval to be measured. A slight error or indeterminacy however has been introduced due to the finite slope of the wave fronts of the pulse according to 2(C). In order to minimize this influence it is advisable to amplify the pulses strongly, thus increasing their steepness and to limit their amplitude, if required.

The pulses from the reproducing head 13 established in accordance with a unidirectional signal on the disk 10 are amplified by the amplifier 19 and are used to flash a light source 20. The illumination from the source 20 is thrown on a revolving scale 21 which, for convenience and exact synchronization with the magnetic disk 10, is mounted on the motor shaft 11. The light source used is a glow tube, preferably grid controlled, having a very short period of illumination, and causing the revolving scale 21 to appear to stop at two points, one corresponding to the start of the unidirectional signal and the other corresponding to the end of the unidirectional signal. The angle between the two points can be measured, and knowing the rate of rotation of the disk 10 during recording the length of the time interval can be determined. One point at which the scale 21 will appear to be stopped will be the point at which the voltage pulse due to the start of the magnetic pattern on the disk 10 causes the glow tube 20 to light, and the other point will be the point at which the voltage pulse due to the end of the magnetic pattern on the disk 10 causes the glow tube 20 to light. Accordingly, the displacement between the beginning and the end of the magnetic pattern can be found, and this displacement is an indication of the length of the interval which was timed. For convenience, the scale 21 may be divided into units and fractions of units. One of the readings is subtracted from the other and the resultant is the number of units that the disk rotated during the interval to be timed. Knowing the rate of rotation of the disk during the recording operation the operator can easily determine the duration of the interval to be timed, or the scale 21 may be divided directly in time intervals.

In order to prepare the magnetic disk 10 for timing another interval, it is necessary to bring the disk 10 to a state of uniform magnetic condition. This may easily be done by the obliterating head 22 to which is connected a battery 23. In the circuit is a switch 24 and a condenser 25. When it is desired to obliterate a previous record the switch 24 is temporarily closed thereby magnetically saturating the magnetic disk 10 for at least one complete revolution, and simultaneously charging the condenser 25. The switch 24 is then opened and the condenser gradually discharges through the obliterating head 22.

If it were not for the gradual discharge of the condenser 25 a magnetic irregularity would be left on the disk due to the quick breaking of the battery current when switch 24 was opened, and the magnetic irregularity might cause the glow tube 20 to fire thereby interfering with reading the scale 21. It is important that the battery 17 and its recording head 13 establish a magnetic flux through the disk which is in a direction opposite to the direction of the flux established by the battery 23 and the head 22. Another way of obliteration consists in supplying the obliterating head with a gradually decaying alternating current, thus returning the steel disk to its virgin or non-magnetic state.

A disadvantage of the described system is that the glow tube flash corresponding to the start of the interval to be timed cannot be readily distinguished from the glow tube flash corresponding to the end of the interval to be timed. Therefore, instead of one glow tube two glow tubes may be used, and they may have a distinguishing feature such as color. For instance, one tube may be red and the other tube may be green. When a direct current from a battery is used to establish a magnetic pattern on the disk, and the disk is rapidly rotated past the reproducing head, two pulses of voltage will be produced, and they will be of opposite polarity, as has been previously explained. One tube can be made to operate only upon a pulse of a first polarity, and the other tube can be made to operate only upon a pulse of the opposite polarity. The observer will consequently see two superposed scales, one red and one green, and he will know that the red scale corresponds, for example, to the start of the signal and that the green scale corresponds to the end of the signal.

In order to obviate this difficulty of reading two scales and subtracting one reading from the other I have devised the following system in which only one reading has to be taken.

Figure 3 illustrates this method which may be found convenient, and Figures 8 and 9 illustrate a scale 21 which may be used. In Figures 8 and 9 the thickness of the scale indications has been exaggerated in order that they can be lined to indicate color. The scale disk 21 is predominantly opaque to the passage of light and is predominantly non-reflecting. The zero section on the scale is made opaque and fluorescent or opaque and highly light reflective, and all the other scale indications around the disk are made transparent to light. Figure 8 illustrates an enlarged portion of the disk 21 as it would appear when no light is being transmitted through it and red light is being reflected from it. Only that portion termed the zero section is visible, and it is this portion only which is highly light reflective. Accordingly, when the scale is illuminated only from the front the observer will see only the zero section which will appear red. A glow tube 30 is mounted in front of the disk 21 with its light directed toward the surface thereof, and is connected to the amplifier 19 and the reproducing head 13 so that it will fire only for an electromotive force of a first polarity, and that electromotive force is the one which is generated in accordance with the start of the magnetic pattern on the magnetic disk 10. A glow tube 31 is mounted behind the disk 21 and is responsive only to an electromotive force of the opposite polarity which is generated in accordance with the end of the magnetic pattern on the magnetic disk. During reproduction the tube 30 will flash once for each revolution of the magnetic disk 10, and will illuminate the scale 21 at a point corresponding to the start of the magnetic pattern on the disk 10. By the stroboscopic effect the scale 21 will appear to be standing still, and all the observer can see will be the light reflective zero section. By adjusting the position of the reproducing head 13 with respect to the magnetic disk 10, the zero section on the scale 21 may be made to appear at any point around the scale. This will be described later in more detail. For convenience the head 13 may be moved until the zero section on the scale 21 is at the top of the disk where strong intermittent flashes from the tube 30 are reflected from the zero section into the observer's eye 29. A shield 28 may be provided to prevent the direct rays from the tube 30 from reaching the observer's eye, and a shield 27 may be provided to prevent rays from tubes 30, 31 from interfering with each other. Tube 30 will flash once for each revolution of the disk, thereby momentarily illuminating the disk in one position corresponding to the beginning of the interval to be timed. To the observer the disk will appear to stand still, and will appear to be black except for the zero section which reflects light, such as is shown in Figure 8. This black appearance arises from the black opaque background absorbing the light from tube 30, and from the transparent scale portion transmitting the light through the disk with no reflection to the observer's eye. Tube 31 will also flash once in each revolution of the disk, thereby momentarily illuminating the disk in a second position corresponding to the end of the interval to be timed. To the observer the transparent scale indication of the disk 21 will become visible due to transmitted light from tube 31, and will appear to stand still due to the stroboscopic effect. The zero section, being reflective, is visible only during flashes of tube 30, and the transparent scale indications are visible only during flashes of tube 31, thereby giving an overall effect of one single zero section superposed on one scale image. This is shown in Figure 9 wherein the figures are transparent and transmit green light (due to tube 31 being green) through the disk 21 to the observer's eye. Figure 9 shows the red zero section as it appears superimposed on the green scale indications. Each tube will flash once during each revolution of the magnetizable disk 10, and in my chosen example wherein the motor 12 drives the disk at 1800 revolutions per minute, each tube will flash 30 times per second. This rapid flashing, together with the retentivity of the human eye, will cause substantially a steady flickerless image of the zero section and the scale indications to appear superimposed on each other. To obtain more accurate readings the above mentioned zero section can be replaced by a short vernier section. A further means of distinguishing between the two flashes may be to color the tubes as has been described before. The apparent relative position of the scale image with respect to the zero section provides an indication of the duration of the interval to be timed. The reading shown in Figure 9 represents a time interval of 1.66 milliseconds. Figure 10 is a black on white representation of a whole disk 21 calibrated for directly reading milliseconds when the disk speed is 1800 revolutions per minute. In this case the disk is divided into 33⅓ intervals, and each interval represents one millisecond. The length of the zero section represents one millisecond, and is divided into ten equal parts whereby a direct reading of one-tenth of a millisecond may be obtained, and an estimate to one one-hundredth of a millisecond is feasible.

Another possibility would be to divide each millisecond on the face of the disk into 10 equal parts, and to divide the zero section as a vernier whereby more accurate readings could be obtained.

Several methods can be used to cause the zero section to be immediately under the tube 30 when the tube flashes. The first has already been explained briefly and comprises moving the reproducing head 13 with respect to the rotating disk

10 thereby changing the point at which the beginning and end of the magnetic pattern on the disk 10 influences the head 13 to cause pulses to be established. This may be explained by imagining that the motor 12 is not driving disks 10 and 21 and that the disks are, therefore, for the moment stationary, and imagining that the head 13 is rotated with respect to the disk 10, so that instead of being at the top of the disk it has some other position say, for instance, down near the obliterating head 22. If, for example, the head 13 were moved through an angle of 175° and the motor 12 started, the reproduced beginning and ending signals would appear to have the same relative position with respect to each other, but each would be displaced 175° with respect to the positions that they occupied when the reproducing head 13 was in the position shown in Figure 1. Two other methods are to rotate either the magnetic disk 10 or the scale disk 21 with respect to the shaft 11. This may be done by stopping the motor 12 so that disks 10 and 21 are not rotating and removing either the disk 10 or the disk 12 from the shaft 11 and turning it with respect to the shaft and then replacing it. This, in effect, causes relative movement between disks 10 and 21 and, according to the amount of relative movement, will cause the reproduced signal to be displaced with respect to the point where it originally appeared. In other words, relative movement between any two elements such as between the magnetic disk 10, the scale 21, or the reproducing head 13 will cause the zero section of the scale 21 to appear to move, and by any of these adjustments the zero section of the scale can be brought under the tube 30 when the tube fires. In the operation of my device it is inconvenient to have to stop the motor and the disk in order to make such an adjustment. Accordingly, as it is easier, I prefer to move the reproducing head 13 with respect to the disks. This may be done without stopping the device by mounting the head 13 in a movable manner on a track which will cause the head 13 to move arcuately with respect to the disk 10 in a plane which is parallel to the surface of the disk, and to provide means for moving the head on the track.

Figure 4:
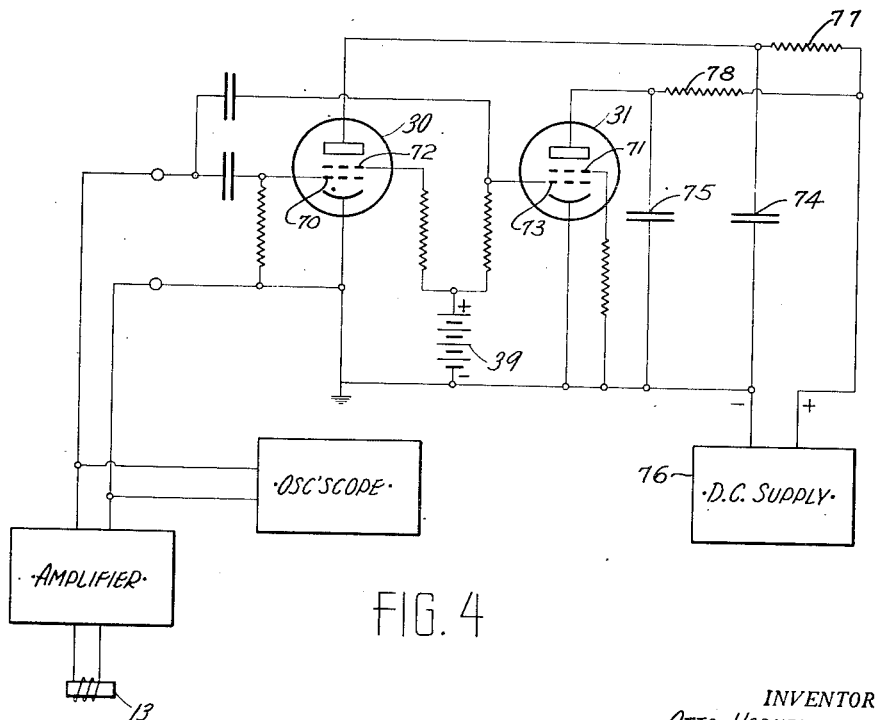
Figure 4 is a circuit diagram of a portion of my invention.

Figure 4 is a detailed circuit of the means for causing tubes 30 and 31 to flash only for a pulse of one polarity. The head 13 picks up a signal from the magnetic disk which is amplified and applied to the grid glow tubes 30, 31. The glow tube 30 has two grids 70 and 72 and the glow tube 31 has two grids 71 and 73. Grids 72 and 73 are connected through resistors to the positive terminal of battery 39, so that grids 72 and 73 are at the same positive potential with respect to ground. Grids 70 and 73 are each connected through a condenser to the output of the amplifier which amplifies the signal reproduced by the head 13. The tubes are grid biased by the battery 39 to cause the tube 30 to fire for a voltage of, for example, +30 volts, and to cause the tube 31 to fire for a voltage of, for example, −30 volts. A signal of a negative polarity from the amplifier will cause the glow tube 30 to discharge between the biased grid 72 and the grid 70 thereby initiating the firing of the tube 30. This same signal will be ineffective to cause tube 31 to fire as it will be tending to reduce the potential difference existing between grids 71 and 73. A signal of positive polarity from the amplifier will be ineffective to cause tube 30 to fire as it will be tending to decrease the existing potential difference between grids 70 and 72, but it will be effective to cause tube 31 to fire because it will increase the potential difference between grids 71 and 73 to an extent that an initial breakdown is caused between the grids, thereby causing a breakdown between the plate and the cathode. The final breakdown (or firing) of the glow tubes 30, 31 is effected by the sudden discharge of condensers 74 and 75, respectively, through the glow tubes when the aforementioned critical grid voltage conditions are reached. During the intervals between two consecutive firings of each glow tube (i. e., within the duration of one revolution of disk 10), the condensers 74 and 75 are recharged from the power supply 76 through the resistors 77 and 78, respectively. By arranging the critical grid potential differences to be a substantial amount above the background noise, stray signals due to the background noise are not sufficient to cause the tubes to fire.

Another advantageous method of reducing the danger of the tube firing due to background noise is to use for the reproduction a class C amplifier with a push-pull output, and to coordinate the two pulses as obtained from the two output tubes of the amplifier to the glow tubes. This coordination is done in such a way that the pulse corresponding to the beginning of the time interval is fed into one glow tube, and the pulse corresponding to the end of the time interval is fed into the other glow tube. Inasmuch as the necessary discrimination between the starting and ending pulse takes place in the push-pull circuit the two glow tubes can now be made to be responsive to pulses of the same polarity. The amount of bias used in the class C amplifier gives a convenient means of discriminating against any unwanted signals and to limit the amplitude of the two pulses to a suitable value.

Figure 5 diagrammatically illustrates a timing device utilizing an oscillator 16 for supplying the signal the duration of which is controlled by electronic switch 15 which is closed and opened in accordance with the interval to be timed. The magnetic disk 10 and the scale 21 are driven by motor 12 at a known and constant rate of speed. The recording head 13 is supplied by current from the oscillator 16, and the length of time that the current is supplied to the head 13 is controlled by the length of time the switch 15 is held closed by the control circuit. The alternating electromotive force generated by the reproducing head 13 upon the magnetized disk 10 being driven past it is amplified by the amplifier 33, and is then rectified at 34 in order to establish a signal of direct current. This signal current is then fed into the differentiating device 35, and its output which consists of one short voltage pulse corresponding to the beginning of the magnetic pattern on the disk 10, and one short voltage pulse corresponding to the end of the magnetic pattern on the disk 10, is passed to the glow tube 20 to cause it to flash. Obviously, the devices shown in Figures 3 and 4 could be used with the circuit of Figure 5 if it is desired.

Figure 6:
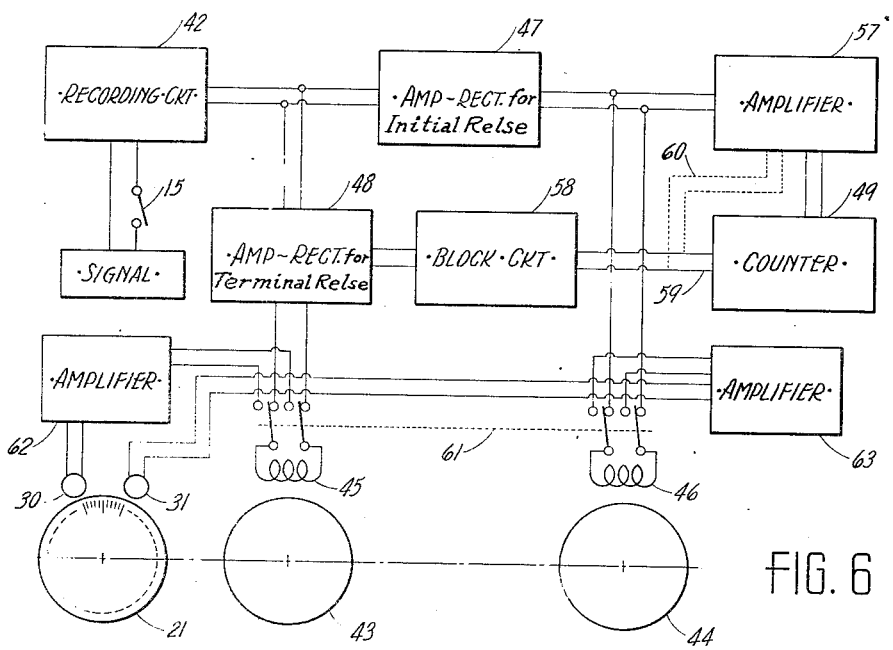
Figure 6 is a block diagram of a device for timing long intervals.

The previously described devices are for timing intervals the duration of which is shorter than the length of time for one revolution of the magnetic material. If it is desired to time a longer interval a circuit as shown in Figure 6 may be used. The timing signal, such as would be established by a trigger circuit closing and opening switch 15 is applied to a suitable circuit 42 which establishes, for instance, a rectangular direct current signal. Two magnetic disks 43 and 44 are provided on a single shaft and recording-reproducing heads 45 and 46 are provided for recording a record on and reproducing the record from the disks. A differentiating amplifier 47 which also has a rectifier action is provided between the circuit 42 and the recording-reproducing head 46. By the differentiating action the rectangular direct current signal is converted into two short oppositely directed pulses, and by the rectifier action only the short pulse corresponding to the beginning of the signal is passed to the head 46. Similarly, a biased differentiating amplifier 48 is provided for passing only the short pulse corresponding to the end of the signal to the head 45.

When a long interval is to be timed, a short pulse, corresponding to the beginning of the interval, is thus established by the circuit 47 and is then recorded on the disk 44 by the head 46. Each successive revolution of the disk 44 before the end of the time interval will cause the magnetic pattern corresponding to that recorded pulse to pass the head 46, which now acts as a reproducing head, and to establish a short pulse. This signal is amplified in amplifier 57 and subsequently applied to the counter 49 which thereby keeps track of the number of complete revolutions of the disk 44. The counter 49 is made responsive only to pulses of a polarity opposite to the polarity of the starting pulse as received from amplifier 47, thereby preventing counter 49 from being actuated by the starting pulse as received from amplifiers 47 and 57. The pulse, as reproduced from disk 44 by the reproducing head 46, has a polarity opposite to the polarity of the starting pulse as recorded and accordingly, the reproduced pulses will actuate the counter. When the end of the signal to be timed (represented by opening of switch 15) reaches the amplifier 47 it is blocked and when it reaches amplifier 48 there is established a short pulse which as a polarity opposite to the polarity of the starting pulse. This short end pulse is applied simultaneously at two points in the circuit. It is applied to the blocking trigger circuit 58 which blocks the counter 49 to prevent subsequent revolutions of the disk 44 from actuating the counter. The blocking pulse does not actuate the counter. This blocking action can be through connections 59 directly to the counter 49, or through connections 60 from the blocking trigger circuit 58 to the amplifier 57, thereby applying to the amplifier 57 a bias which blocks the signal to the counter 49. At the same time the ending pulse is applied to the counter 49 it is also applied to the recording head 45 to establish on the disk 43 a magnetic indication corresponding to the end of the interval to be timed.

There are now three records available from my device. The counter 49 has a record of the number of complete revolutions of the disk 44 between the beginning and the end of the interval to be timed. The disk 44 has a short magnetic pattern at a certain point corresponding to the beginning of the interval to be timed, and the disk 43 has a short magnetic pattern at a certain point corresponding to the end of the interval to be timed. The duration can be determined from these three records. The rate of rotation of the disks 43, 44 is known and the number of whole revolutions which were made during the interval to be timed is known. By throwing the switch 61 the reproducing head 45 and the reproducing head 46 each generate an electromotive force, and the electromotive force generated by head 45 is amplified in the biased amplifier 62 and used to control the tube 30 to cause it to flash stroboscopically. The electromotive force generated by head 46 is amplified in the biased amplifier 63 and used to control tube 31 to cause it to flash stroboscopically.

These amplifiers are biased to provide a rectifying action because the electromotive pulses as reproduced by the heads 45, 46 each comprise a positive and a negative half. For the proper actuation of the tubes 30, 31 only half of each pulse must be passed to each glow tube. In this manner tube 31 is controlled only by the starting pulse and tube 30 is controlled only by the ending pulse.

Instead of using two separate biased amplifiers 62, 63 a single class C push-pull amplifier can be used. Any fraction of a revolution of the disks 43, 44 between the beginning and the end of the interval to be timed which is in addition to the whole revolutions counted by the counter 49, can be determined on the scale 21 which is on the same shaft as the magnetic disks. Adding the two indications gives the exact number of whole revolutions and any fraction of a revolution of the disks during the interval to be timed. From this the duration of the time interval can be determined.

The counter 49 may be either an electro-mechanical counter or, preferably, an electronic counter, for instance of the type described in the literature as "ring circuit." (Wynn-Williams, Proc. of the Royal Soc., Ser. A, vol. 132, July 2, 1931; C. C. Shumard, Electr. Eng. vol. 57, #5, p. 209, May 1938.)

Instead of a "step-by-step" counter a continuously indicating electric stop clock may also be used. The circuit connection may then be made similar to Figure 6 with the exception that only the starting and ending pulse are needed to start and to stop the motion of the clock. The total number of whole disk revolutions within the time interval to be measured may then be read on the clock whose dial is preferably calibrated in units corresponding to the duration of one disk revolution. Any excess time beyond a whole number of disk revolutions is determined from the stroboscopically illuminated scale 21 in the very same way as previously described.

I have found that although it is desirable it is not necessary to have the biased amplifier 48. Any direct current signal applied to the disk 43 longer than for one revolution of the disk automatically obliterates the pulse corresponding to the beginning of the interval to be timed and leaves a sufficient pulse corresponding to the end of the interval to be timed.

If it is desired a single disk can be used instead of the disk 43, 44 and the recording-reproducing heads 45, 46 can be positioned to record on and reproduce from tracks which do not interfere with each other.

It is, of course, not necessary to have the time interval converted into a corresponding rectangular D. C. signal by the circuit 42, since two single pulses must finally be derived in any case. Consequently, the two single pulses could also be generated in circuit 42 or they may be available directly from the beginning and the end of the event to be timed.

Figure 7:
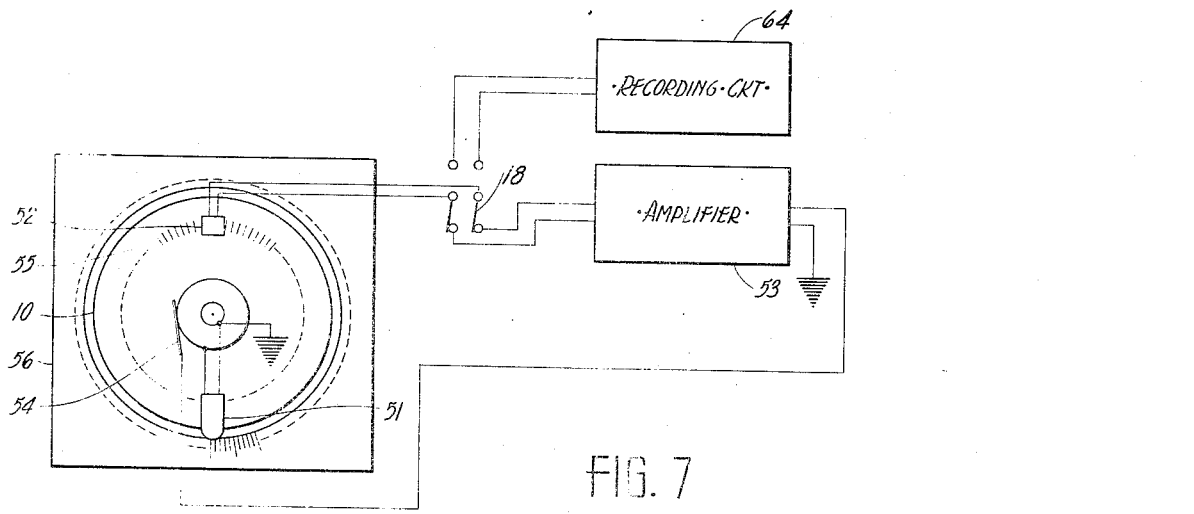
Figure 7 shows another form of my invention.

Figure 7 shows a form of my invention in which the glow tube 51 is fastened to the revolving magnetic disk 10. A recording-reproducing head 52 is held stationary with respect to the revolving disk and is adapted to establish an electromotive force due to an alternating magnetic signal which has been put on the disk by the recording circuit 64, and which bears a relationship to the length of the interval to be timed. The output of the reproducing head 52 is connected to the amplifier 53 and the output of the amplifier is connected to a slip ring 54, and the slip ring is connected to the neon tube 51. During each revolution of the disk 10 an electromotive force is established in accordance with the length of the alternating magnetic pattern 55 and the glow tube is caused to ignite, thereby giving the observer the impression of a luminous band whose length is directly proportioned to the length of the interval to be timed. A stationary scale 56 is provided adjacent the edge of the disk 10 in order that the operator may accurately determine the number of degrees between the point where the tube 51 ignites for the first time and the point where it is extinguished for the last time in each revolution of the disk 10. For convenience the scale 56 may be marked in time units instead of in degrees for use with disks moving at a known and unvariable rate of speed. It may also be found convenient to be able to rotate the scale 56 with respect to the moving disk 10 to place the zero section of the scale at the point where the glow tube 51 ignites.

Instead of using an alternating signal as described in connection with Figure 7, a direct current signal could be employed. In this case the neon tube 51 would flash at two points in each revolution; once at the beginning and once at the end of the recorded magnetic pattern where the rate of change of the recorded magnetization on the disk is rapid.

Although I have described my invention with a certain degree of particularity, it is to be understood that the present disclosure has been made only by way of example and that numerous changes in the details of construction and the combination and arrangement of parts may be resorted to without departing from the spirit and the scope of the invention as hereinafter claimed.

I claim as my invention:

1. A time measuring device comprising in combination; an endless record member, means for moving the record member at a known and constant rate of speed, means controlled by the interval to be measured for establishing on the record member an indication at the beginning and at the end of the interval to be measured, means for distinguishing between the indications corresponding to the beginning and the end of the interval to be measured, and means for measuring the distance between the indications corresponding to the beginning and to the end of the interval to be measured.

2. A time measuring device comprising in combination; a magnetizable disk, means for rotating the disk at a known and constant rate of speed magnetic recording, means controlled by the interval to be measured for establishing on the disk a short magnetic indication at the beginning and a short magnetic indication at the end of the interval to be measured, means for distinguishing between the indications corresponding to the beginning and the end of the interval to be measured, and means for measuring the angle on said disk between the indications corresponding to the beginning and to the end of the interval to be measured.

3. A time measuring device comprising in combination; an endless record material, means for moving the record material at a known and constant rate of speed, a source of signal, recording means connected to said source of signal, means for controlling the signal in accordance with the beginning and the end of the interval to be measured to establish on the record material a record of at least the beginning and the end of the interval to be measured, reproducing means adapted to establish a signal in accordance with the record on the record material to define and identify at least the beginning and the end of the record, and means for measuring the amount of movement of said record member between the beginning and the end of the time interval to be measured.

4. A time measuring device comprising in combination, a disk of magnetizable material, means for rotating the disk at a known and constant rate of speed, magnetic recording means associated with said magnetizable disk, a source of signal connected to said magnetic recording means, means for controlling the source of signal in accordance with the interval to be measured to cause the magnetic recording means to establish on the magnetizable disk a magnetic pattern, reproducing means associated with the magnetizable disk for establishing an electromotive force in accordance with at least the beginning and the end of the magnetic pattern on the said disk, means for distinguishing between the indications corresponding to the beginning and the end of the interval to be measured, and means actuated by said electromotive force for measuring the amount of rotation of the disk between the beginning and the end of the controlled signal.

5. A time measuring device comprising in combination, a disk of magnetizable material, means for rotating the disk at a known and constant rate of speed, magnetic recording means associated with said magnetizable disk, a source of signal connected to said magnetic recording means, means for controlling the source of signal in accordance with the interval to be measured to cause the magnetic recording means to establish on the magnetizable disk a magnetic pattern; reproducing means associated with the magnetizable disk for establishing two electromotive forces, one in accordance with the beginning and one in accordance with the end of the magnetic pattern on the said disk; a rotating scale synchronized with said rotating disk; and means operated by said electromotive forces for momentarily and periodically illuminating the rotating scale at the beginning and at the end of the magnetic pattern.

6. A device as claimed in claim 5 in which said source of signal is a direct current source.

7. A device as claimed in claim 5 in which said source of signal is an alternating current source, and said reproducing means includes means for rectifying and differentiating to establish said two electromotive forces of short duration and of opposite polarity.

8. A time measuring device comprising in combination; a disk of magnetizable material, means for rotating the disk at a known and constant rate of speed, magnetic recording means associated with said magnetizable disk, a source of direct current signal connected to said magnetic recording means, means for controlling the source of signal in accordance with the interval to be measured to cause the magnetic recording means to establish on the magnetizable disk a magnetic pattern, reproducing means associated with the magnetizable disk for establishing an electromotive force of short duration and of one polarity at the beginning of the magnetic pattern on the said disk, and for establishing an electromotive force of short duration and of the opposite polarity at the end of the magnetic pattern on the said disk, a scale rotating in synchronism with said magnetizable disk, and illuminating means operated by said electromotive force of the one polarity for momentarily and periodically illuminating the rotating scale at the beginning of the magnetic pattern, said illuminating means also being operated by said electromotive force of the opposite polarity for momentarily and periodically illuminating the rotating scale at the end of the magnetic pattern.

9. A time measuring device comprising in combination: a disk of magnetizable material, means for rotating the disk at a known and constant rate of speed, magnetic recording means associated with said magnetizable disk, a source of direct current signal connected to said magnetic recording means, means for controlling the source of signal in accordance with the interval to be measured to cause the magnetic recording means to establish on the magnetizable disk a magnetic pattern, reproducing means associated with the magnetizable disk for establishing an electromotive force of short duration and of one polarity at the beginning of the magnetic pattern on the said disk, and for establishing an electromotive force of short duration and of the opposite polarity at the end of the magnetic pattern on the said disk, a scale rotating in synchronism with said magnetizable disk, and illuminating means operated by said electromotive force of the one polarity for momentarily and periodically illuminating the rotating scale at the beginning of the magnetic pattern, said illuminating means also being operated by said electromotive force of the second polarity for momentarily and periodically illuminating the rotating scale at the end of the magnetic pattern, and means for synchronously shifting the moments at which the magnetic pattern on the magnetizable disk establishes said two electromotive forces in the reproducing means, in order to cause the illuminating means to be actuated at a predetermined angular position of the scale.

10. The process of measuring a time interval comprising the steps of: providing a record material moving at a known and constant rate of speed, providing means for establishing an indication on said moving record material, controlling said means in accordance with the interval to be measured to establish on the record material indications corresponding to the beginning and to the end of the interval to be measured, moving said record material continuously, and during the continuous motion distinguishing between the indications corresponding to the beginning and to the end of the interval to be measured and measuring the distance between the indications corresponding to the beginning and to the end of the interval to be measured.

11. The process of measuring a time interval comprising the steps of rotating a magnetizable material past magnetic recording and reproducing means at a known and constant rate of speed, controlling a signal in accordance with the interval to be measured, applying said controlled signal to the magnetic recording means to establish in the record material magnetic indications corresponding to at least the beginning and to the end of the interval to be measured, repeatedly passing the magnetic material past the reproducing head to repeatedly establish electromotive forces in accordance with at least the beginning and the end of the record on the magnetizable material, and illuminating a scale in accordance with the established electromotive forces.

12. The process of measuring a time interval comprising the steps of rotating a magnetizable material past recording and reproducing means at a known and constant rate of speed, controlling a signal in accordance with the interval to be measured, applying said controlled signal to the magnetic recording means to establish in the record material magnetic indications corresponding to the beginning and to the end of the interval to be measured, repeatedly passing the magnetizable material past the reproducing means to repeatedly establish electromotive forces corresponding to the magnetic indications in the magnetizable material, rotating a scale in synchronism with the rotating magnetizable material, illuminating the scale for a brief time by illuminating means controlled by the electromotive force which was generated by the magnetic indication corresponding to the beginning of the interval to be measured, and illuminating the scale for a brief time by illuminating means controlled by the electromotive force which was generated by the magnetic indication corresponding to the end of the interval to be measured.

13. A time measuring device comprising in combination; a disk of magnetizable material, means for rotating the disk at a known and constant rate of speed, magnetic recording means associated with said magnetizable disk, a source of signal connected to said magnetic recording means, means for controlling the source of signal in accordance with the interval to be measured to cause the magnetic recording means to establish on the magnetizable disk a magnetic pattern, reproducing means associated with the magnetizable disk for establishing an electromotive force of short duration and of one polarity at the beginning of the magnetic pattern on the said disk, and for establishing an electromotive force of short duration and of the opposite polarity at the end of the magnetic pattern on the said disk, a scale rotating at a known rate of speed, first illuminating means operated by said electromotive force of the one polarity for momentarily and periodically illuminating the rotating scale, and second illuminating means operated by said electromotive force of the opposite polarity for momentarily and periodically illuminating the rotating scale.

14. A device as set forth in claim 13 in which said source is a direct current source.

15. A device as set forth in claim 13 in which said source is an alternating current source, and said reproducing means includes means for rectifying and differentiating said signal to establish said two electromotive forces of short duration and of opposite polarity.

16. A time measuring device comprising in combination, a disk, means for rotating the disk at a known and constant rate of speed, means controlled by the interval to be measured for establishing on the disk an indication at the beginning and at the end of the interval to be measured, means for measuring the angle between the indications corresponding to the beginning and to the end of the interval to be measured, and means for distinguishing the beginning of the signal from the end of the signal.

17. A time measuring device comprising in combination, a disk of magnetizable material, means for rotating the disk at a known and constant rate of speed, magnetic recording means associated with said magnetizable disk, a source of signal connected to said magnetic recording means, means for controlling the source of signal in accordance with the interval to be measured to cause the magnetic recording means to establish on the magnetizable disk a magnetic pattern; reproducing means associated with the magnetizable disk for establishing two electromotive forces, one in accordance with the beginning and one in accordance with the end of the magnetic pattern on the said disk; a rotating scale synchronized with said rotating disk; illuminating means connected to said reproducing means and adapted to be flashed by the established electromotive forces, and means for distinguishing between the flashes caused by the electromotive force established by the beginning of the magnetic pattern and the flashes caused by the electromotive force established by the end of the magnetic pattern.

18. A time measuring device comprising in combination, a disk of magnetizable material, means for rotating the disk at a known and constant rate of speed, magnetic recording means associated with said magnetizable disk, a source of signal connected to said magnetic recording means, means for controlling the source of signal in accordance with the interval to be measured to cause the magnetic recording means to establish on the magnetizable disk a magnetic pattern; reproducing means associated with the magnetizable disk for establishing two electromotive forces, one in accordance with the beginning and one in accordance with the end of the magnetic pattern on the said magnetizable disk; a rotating scale disk having indicia means and synchronized with said rotating magnetizable disk, said rotating scale disk being predominantly opaque to light and said indicia means having a first portion which is transparent to light and a second portion which is reflective to light, first illuminating means on one side of the scale disk and connected to said reproducing means and adapted to be flashed by one of the established electromotive forces to illuminate one portion of the indicia means, and second illuminating means on the other side of the scale disk and connected to said reproducing means and adapted to be flashed by the other of the established electromotive forces to illuminate the other portion of the indicia means to cause said two portions to appear superimposed on each other.

19. A time measuring device comprising in combination, endless record means, means for rotating the record means at a known and constant rate of speed, means for providing a signal, means for controlling the signal in accordance with the interval to be measured to establish an electromotive force corresponding to the beginning and an electromotive force corresponding to the end of the interval to be measured, first and second recording means associated with different portions of said record means and connected to said signal means, means for causing said electromotive force corresponding to the beginning of the interval to be measured to influence said first recording means to establish on said record means a first record, control means for causing said electromotive force corresponding to the end of the interval to be measured to influence only said second recording means to establish on said record means a second magnetic record, means controlled by said first record for counting the number of whole revolutions of said record means during the interval to be measured, and means controlled by said first and said second records for indicating a fraction of a revolution of said record means, the number of said whole revolutions and said fractional revolution of the record means together being an indication of the duration of the interval to be measured.

20. The process of measuring a time interval comprising the steps of; providing an endless record material moving at a known and constant rate of speed and having space for a first and a second record track, providing a signal, controlling the signal in accordance with the interval to be measured, recording on the first track of the record material a pulse which corresponds to the beginning of the controlled signal and recording on the second track a pulse which corresponds to the end of the controlled signal, counting whole cycles of the record material during the interval to be measured in accordance with the pulse on said first track, repeatedly producing a signal from each of the two pulses to determine a fractional cycle of the record material and utilizing said whole cycles and said fractional cycle to provide an indication of the duration of the interval to be measured.

21. The process of measuring a time interval comprising the steps of; providing an endless record material moving at a known and constant rate of speed and having space for a first and a second record track, recording on the first track of the record material a pulse which corresponds to the beginning of the interval to be measured and recording on the second track a pulse which corresponds to the end of the interval to be measured, counting whole cycles of the record material during the interval to be measured in accordance with the pulse on said first track, repeatedly producing a signal from each of the two pulses to determine a fractional cycle of the record material and utilizing said whole cycles and said fractional cycle to provide an indication of the duration of the interval to be measured.

22. A time measuring device comprising in combination, an endless record member, means for cyclically driving the said endless record member at a constant rate, signal recording means associated with said record member, a source of signal current connected to said recording means, means for controlling the source of signal current in accordance with the time interval to be measured to cause the recording means to establish on the record member two indications the first of which corresponds to the beginning and the second of which corresponds to the end of the interval to be measured, reproducing means associated with the record member for establishing two electromotive forces, one in accordance with the first recorded indication and the other in accordance with the second recorded indication on the record member, a scale having indicia thereon, means for cyclically driving the scale in synchronism with said record member, and means operated by said two electromotive forces for momentarily and periodically illuminating the scale whereby the indicia thereon may be simultaneously seen in two different positions.

23. A device as set forth in claim 22, further characterized in this: that said illuminating means operated by said two electromotive forces comprises a first and a second glow tube, said first glow tube being momentarily actuated only in accordance with the electromotive force correlated to the first recorded indication on the record member, and said second glow tube being momentarily actuated only in accordance with the electromotive force correlated to the second recorded indication on the record member.

24. A device as set forth in claim 22, further characterized in this: that said scale has reflective indicia and transparent indicia, and said first and second glow tubes are so mounted with respect to the scale that the light from one of the glow tubes is transmitted through the transparent indicia of the scale into the observer's eye and the light from the other glow tube is reflected from the reflective indicia of the scale into the observer's eye.

25. A device as set forth in claim 22, further characterized in this: that said illuminating means operated by said two electromotive forces for momentarily and periodically illuminating the scale includes means for distinguishing between the scale position corresponding to the beginning of the interval to be measured and the scale position corresponding to the end of the interval to be measured.

26. A device as set forth in claim 22, further characterized in this: that said illuminating means operated by said two electromotive forces comprises a first colored glow tube and a second differently colored glow tube, said first glow tube being actuated only in accordance with the electromotive force correlated to the first recorded indication on the record member, and said second glow tube being actuated only in accordance with the electromotive force correlated to the second recorded indication on the record member.

27. A device as set forth in claim 22, further characterized in this: that the signal current is a direct current, and said reproducing means includes means for differentiating the reproduced signal to establish two electromotive forces of short duration and of opposite polarity for operating said illuminating means.

28. A device as set forth in claim 22, further characterized in this: that the signal current is an alternating current, and said reproducing means includes means for rectifying and differentiating the reproduced alternating signal to establish two electromotive forces of short duration and of opposite polarity for operating said illuminating means.

29. A time measuring device comprising in combination, an endless record member, means for cyclically driving the said endless record member at a constant rate, signal recording means associated with said record member, a source of signal current connected to said recording means, means for controlling the source of signal current in accordance with the time interval to be measured to cause the recording means to establish on the record member two indications the first of which corresponds to the beginning and the second of which corresponds to the end of the interval to be measured, reproducing means associated with the record member for establishing two electromotive forces, one in accordance with the first recorded indication and the other in accordance with the second recorded indication on the record member, a scale having indicia thereon, means for cyclically driving the scale in synchronism with said record member, means operated by said two electromotive forces for momentarily and periodically illuminating the scale whereby the indicia thereon may be simultaneously seen in two different positions, and means for synchronously shifting the moments at which the two indications on the record member establishes said two electromotive forces in the reproducing means in order to cause the illuminating means to be actuated at a predetermined position of the scale.

30. A time measuring device comprising in combination, a record disk connected to a rotatable shaft, means for rotating said shaft at a constant rate, electrical signal recording means associated with said disk, a source of electrical current connected to said recording means, means for controlling the signal current in accordance with the time interval to be measured to cause the recording means to establish on the disk two indications the first of which corresponds to the beginning and the second of which corresponds to the end of the interval to be measured, reproducing means associated with the record disk for establishing two electromotive forces of short duration one in accordance with the first indication and the other in accordance with the second indication on the record disk, a scale disk having reflective and transparent indicia thereon, said scale disk being connected to the same rotatable shaft as said record disk, first and second glow tubes electrically connected to said reproducing means, one of said tubes mounted in front of and the other behind said scale disk, said first glow tube being actuated only in accordance with the electromotive force derived from the first indication on the record disk and said second glow tube being actuated only in accordance with the electromotive force derived from the second indication on the record disk for momentarily and periodically illuminating said scale disk in two positions during each revolution thereof whereby the transparent indicia thereon becomes visible to the observer by light transmitted through the scale disk and the reflective indicia becomes visible to the observer by light reflected from the scale disk.

31. A device as set forth in claim 30, further characterized in this: that said record disk is of magnetizable material, and said recording and reproducing means are magnetic recording and reproducing means.

32. A device as set forth in claim 30, further characterized in this: that said record disk is of magnetizable material, said recording and reproducing means are magnetic recording and reproducing means, said source of electrical current is a source of alternating electrical current, said reproducing means includes means for rectifying and means for differentiating the reproduced alternating signal whereby two short electromotive pulses of opposite polarity are established, and means are provided for actuating one of said glow tubes only in accordance with an electromotive pulse of one polarity and for actuating the other glow tube only in accordance with the electromotive pulse of the opposite polarity.

33. In a time measuring device, a magnetizable record disk, means for rotating said record disk at a known and constant rate of speed, magnetic recording means controlled by the interval to be measured and associated with said record disk for establishing thereon a short magnetic indication corresponding to the beginning of the interval to be measured and a short magnetic indication corresponding to the end of the interval to be measured, magnetic reproducing means associated with said record disk for reproducing the records thereon once during each of successive revolutions of said record disk past said reproducing means to establish during each revolution of said record disk two electromotive forces of short duration, one correlated to the beginning and the other correlated to the end of the interval to be measured, means for distinguishing between the electromotive force corresponding to the beginning and the electromotive force corresponding to the end of the interval to be measured, scale disk means driven in synchronism with said record disk, and glow tube means connected to said reproducing means and actuated by said electromotive forces for stroboscopically illuminating said scale disk means in two angularly displaced positions.

34. A time measuring device as set forth in claim 19 further characterized in this: that said endless record means is of magnetizable material and said recording and reproducing means are magnetic recording and reproducing means.

35. A time measuring device as set forth in claim 19 further characterized in this: that said endless record means is of magnetizable material, said recording and reproducing means are magnetic recording and reproducing means, and that the first magnetic recording means which records the said first record includes a head which automatically functions as a reproducing head to establish an electromotive force for actuating the said counting means for each revolution of the said endless record means subsequent to the rotation during which said first record was made on the said endless record means.

36. A time measuring device as set forth in claim 19 further characterized in this: that said endless record means is of magnetizable material, and said first and second recording and reproducing means are magnetic recording and reproducing means and that each includes a magnetic head which serves both as a recording head and as a reproducing head.

37. A time measuring device comprising in combination, endless magnetizable record means having first and second endless record tracks thereon, means for rotating said record means at a known and constant rate, first and second magnetic recording means associated respectively with said first and second record tracks for recording on said first track a first magnetic pulse corresponding to the beginning of the interval to be measured and for recording on said second track a second magnetic pulse corresponding to the end of the interval to be measured, means actuated by the record on said first track for counting the number of whole revolutions of said record means between the moment when the first and the second magnetic pulses were recorded, first and second magnetic reproducing means associated respectively with said first and second record tracks for establishing during each of successive revolutions of said record means a first electromotive force corresponding to the first magnetic pulse and a second electromotive force corresponding to the second magnetic pulse, scale means, means for rotating said scale means in synchronism with said record means, illuminating means connected to said first and second reproducing means for stroboscopically illuminating said rotating scale means in accordance with said first and second electromotive forces whereby the scale disk may be seen in two angularly displaced positions representing less than a whole revolution of said record means, the duration of said time interval to be measured being the sum of the time for the whole revolutions as indicated by said counter means and the time for the fractional revolution of the record means as indicated by the said scale disk.

38. A time measuring device as set forth in claim 37, further characterized in this: that said illuminating means comprises two glow tubes one of which is connected to the said first magnetic reproducing means and the other of which is connected to the said second magnetic reproducing means.

39. A time measuring device as set forth in claim 37, further characterized in this: that said illuminating means comprises two glow tubes one of which is connected to the said first magnetic reproducing means and the other of which is connected to the said second magnetic reproducing means, and characterized by means for distinguishing between the illumination provided by the glow tube actuated by said first electromotive force and the illumination provided by the glow tube actuated by the said second electromotive force.

40. A time measuring device as set forth in claim 37, further characterized in this: that said illuminating means comprises two differently colored glow tubes one of which is connected to the said first magnetic reproducing means and the other of which is connected to the said second magnetic reproducing means for distinguishing between the illumination established by the glow tube actuated by said first electromotive force and the illumination established by the glow tube actuated by said second electromotive force.

OTTO KORNEI.